United States Patent
Thong et al.

(10) Patent No.: US 7,181,398 B2
(45) Date of Patent: Feb. 20, 2007

(54) VOCABULARY INDEPENDENT SPEECH RECOGNITION SYSTEM AND METHOD USING SUBWORD UNITS

(75) Inventors: Jean-Manuel Van Thong, Arlington, MA (US); Pedro Moreno, Cambridge, MA (US); Edward Whittaker, Aachen (DE)

(73) Assignee: Hewlett-Packard Development Company, L.P., Houston, TX (US)

( * ) Notice: Subject to any disclaimer, the term of this patent is extended or adjusted under 35 U.S.C. 154(b) by 745 days.

(21) Appl. No.: 10/109,251

(22) Filed: Mar. 27, 2002

(65) Prior Publication Data

US 2003/0187643 A1    Oct. 2, 2003

(51) Int. Cl.
G10L 15/04    (2006.01)
G10L 15/00    (2006.01)

(52) U.S. Cl. .................... 704/254; 704/251
(58) Field of Classification Search ................ 704/254, 704/251
See application file for complete search history.

(56) References Cited

U.S. PATENT DOCUMENTS

| | | | | |
|---|---|---|---|---|
| 5,315,689 A | * | 5/1994 | Kanazawa et al. | 704/238 |
| 5,369,726 A | * | 11/1994 | Kroeker et al. | 704/236 |
| 6,292,778 B1 | * | 9/2001 | Sukkar | 704/256 |
| 6,389,395 B1 | * | 5/2002 | Ringland | 704/254 |
| 6,456,970 B1 | * | 9/2002 | Kao | 704/256 |
| 6,539,353 B1 | * | 3/2003 | Jiang et al. | 704/254 |
| 6,601,028 B1 | * | 7/2003 | Yan | 704/254 |
| 6,738,741 B2 | * | 5/2004 | Emam et al. | 704/251 |
| 6,757,652 B1 | * | 6/2004 | Lund et al. | 704/254 |
| 2001/0016816 A1 | * | 8/2001 | Lucke | 704/254 |
| 2003/0123737 A1 | * | 7/2003 | Mojsilovic et al. | 382/224 |

OTHER PUBLICATIONS

Srinivasan, S. Petkovic, D. "Phonetic Confusion Matrix Based Spoken Retrieval" Proceeding on the 23rd annual international ACM SIGIR conference on research and development of information retrieval, 2000, pp. 81-87.*

Whittaker, E.W.D., and Woodland, P.C., "Particle-based Language Modeling," in *Proc. of the Internat'l Conf. on Spoken Language Processing*, Beijing, China: (2000).

Whittaker, E.W.D., "Statistical Language Modelling for Automatic Speech Recognition of Russian and English." Doctoral Dissertation, University of Cambridge, United Kingdom (2000).

(Continued)

*Primary Examiner*—David Hudspeth
*Assistant Examiner*—Matthew J. Sked
(74) *Attorney, Agent, or Firm*—Richard P. Lange

(57) ABSTRACT

A speech recognition system provides a subword decoder and a dictionary lookup to process a spoken input. In a first stage of processing, the subword decoder decodes the speech input based on subword units or particles and identifies hypothesized subword sequences using a particle dictionary and particle language model, but independently of a word dictionary or word vocabulary. Further stages of processing involve a particle to word graph expander and a word decoder. The particle to word graph expander expands the subword representation produced by the subword decoder into a word graph of word candidates using a word dictionary. The word decoder uses the word dictionary and a word language model to determine a best sequence of word candidates from the word graph that is most likely to match the words of the spoken input.

15 Claims, 5 Drawing Sheets

OTHER PUBLICATIONS

Cormen, T.H., et al., "16.3, Longest Common Subsequence." In *Introduction to Algorithms*, The MIT Press, eds. (NY: McGraw-Hill), pp. 314-319 (1990).

Whittaker, E.W.D., et al., "Vocabulary Independent Speech Recognition using Particles," in *Proc. of the Automatic Speech Recognition and Understanding Workshop*, Madonna di Campiglio, Trento, Italy (Dec. 2001).

* cited by examiner

VOCABULARY INDEPENDENT SPEECH RECOGNITION SYSTEM AND METHOD USING SUBWORD UNITS

RELATED APPLICATION(S)

This application is related to U.S. application Ser. No. 10/017,797, filed Dec. 12, 2001, titled "Systems and Methods for Combining Subword Detection and Word Detection for Processing a Spoken Input," the entire teachings of which are incorporated herein by reference.

BACKGROUND OF THE INVENTION

Most traditional speech recognition (detection) systems ignore words that are not in the recognizer's dictionary vocabulary (out-of-vocabulary or OOV words). At most, some traditional speech recognition systems attempt to minimize the effect of such OOV words by selecting a vocabulary that is closely matched to the domain and that is as large as possible. In the area of spoken document retrieval there are almost always OOV words with respect to the vocabulary that is used. Potentially, the OOV words may be also the most interesting words for indexing purposes.

Traditional methods for detecting OOV words have focused primarily on phoneme or syllable-based recognition systems, which place no restrictions on the words to be recognized. Because of the poor error rate of traditional phoneme based recognition, the best hypothesis is not good for indexing, since many OOV words would be lost. Instead, phoneme lattices must be stored and searched anew each time a query is made. The search thus scales approximately linearly in the size of the data which results in a slow search compared to word-based retrieval techniques. In contrast, traditional word-based indexing involves a simple look-up of the query word in a hash table to retrieve documents in which the query word occurs. This search is approximately constant in the size of the data.

SUMMARY OF THE INVENTION

The present invention provides a method and system for performing speech detection (recognition) that is not dependent on a fixed word vocabulary (dictionary). The present invention uses subword units as the recognition units in the speech recognition system which permits word-vocabulary independent speech decoding in a first speech detection stage that performs subword unit detection. A subword unit represents a concatenated phoneme sequence.

The present invention provides a second speech detection stage that performs word detection. The second stage includes a subword to word graph expander, which expands each string of subword units (that represents a word in the N-best hypothesis) from the subword unit speech decoder (recognizer) into a list of phonetically similar word candidates using a phoneme confusion matrix. The approach of the present invention uses this phoneme confusion matrix to hypothesize words that "sound" similar to the sequence of subwords.

In the second stage, the present invention also provides a word decoder that re-decodes the resulting word graph using a word language model to produce the final word hypothesis. While being word-vocabulary independent, the method of the present invention using a subword speech decoder (recognizer) has similar performance to using a traditional word N-gram speech recognizer of comparable complexity.

Regarding the problem of detection of OOV words, conventional methods may combine the advantages of both traditional subword and word based speech detection methods; for example, by storing concatenated sequences of three or four phonemes in an index as for word-based retrieval. But these conventional methods do not attempt to generate the word transcription from the phonemes as in the present invention, but rather index the subwords in their native form.

The method and system of the present invention has potential applications in spoken document retrieval for recovering OOV words. The present invention performs speech recognition by using subword units that may be thought of as lying somewhere between words and phonemes. In one embodiment, these subword units are termed "particle units," which represent word-internal concatenated phoneme units and are determined automatically. The present invention includes a speech recognizer (decoder) that is built using concatenated triphone acoustic models to represent the particle units and a subword language model to represent the linguistic dependencies between particle units. By recognizing particles from speech in the first speech detection stage, the approach of the present invention postpones the decision on a set of words to recognize. The present invention performs the second stage of recovering (detecting) words from the particle hypothesis as a post-processing step (after the first stage of particle recognition) once the word vocabulary has been defined and a corresponding dictionary and language model constructed. After the second speech detection stage of word detection, conventional word-indexing techniques can then be used.

Another potential application of the present invention is in client-server speech applications. By incorporating a subword-based decoder (recognizer) on the client (computer) side, only the subwords themselves need to be transmitted (e.g., via a network connection) to a server computer. The server then performs the necessary post-processing to convert the subword hypothesis into a word hypothesis, which is then transmitted (e.g., via the network connection) back to the client. Such an approach constitutes a parsimonious representation for data flow between client and server. In addition, the subword vocabulary (e.g., subword dictionary) of the recognizer (decoder) on the client side can be fixed while the word vocabulary (e.g., word dictionary) on the server side can be adapted easily to account for the changing context or environment of the client.

The present invention provides a subword-based recognizer (decoder) that gives comparable word error rates to a conventional word-based recognizer (decoder). The present invention has the potential of greatly reducing the processing time of large corpora (e.g., composed of 1000's or 10,000's of input documents). When new words appear, the present invention provides for a simple re-processing of previous acoustic subword decodes (provided by the subword decoder of the present invention). The approach of the present invention also makes feasible the use of extremely large vocabularies since the approach is to re-score a subword-based input (provided by the subword decoder). For example, while a convention word recognizer has a vocabulary of 64,000 words, in contrast, with the approach of the present invention, a speech detection system can easily process vocabularies of a very large size, such as 500,000 words with similar complexity and processing demands.

Thus, the present invention provides a method and apparatus for detecting a sequence of input words in a spoken input. In a preferred embodiment, a computer system includes a subword decoder and a dictionary lookup module (e.g., including a subword to word graph expander and word decoder). The subword decoder generates a subword representation of the spoken input. The subword representation includes (i) subword unit tokens based on the spoken input and (ii) end of word markers that identify boundaries of hypothesized subword sequences that potentially match the input words in the spoken input. The dictionary lookup module (e.g., using a subword to word graph expander) expands the subword representation into a word graph of word candidates for the input words in the spoken input. Each word candidate is phonetically similar to one of the hypothesized subword sequences. The dictionary lookup module (e.g., using a word decoder) determines a preferred sequence of word candidates based on the word graph. The preferred sequence of word candidates represents a most likely match to the spoken sequence of the input words.

In another embodiment, the subword decoder identifies the subword unit tokens based on the spoken input to produce the subword representation of the spoken input, and inserts end of word markers in the subword representation. Each end of word marker indicates an end of a hypothesized subword sequence.

In a further embodiment, the subword decoder determines the subword unit tokens based on a subword unit dictionary and a subword unit language model.

The subword unit language model, in another embodiment, is a statistical language model.

In one embodiment, the dictionary lookup module (e.g., using a subword to word graph expander) expands the subword representation into the word graph by generating a sequence of phonemes by expanding the subword unit tokens in the subword representation, and by expanding each word phoneme string in the phoneme sequence into a list of phonetically similar word candidates to form the word graph. The sequence of phonemes includes end of word delimiters, which are based on the respective end of word marker in the respective subword representation. Each end of word delimiter indicates the word phoneme string within the sequence of phonemes.

The dictionary lookup module, in another embodiment, determines the preferred sequence of word candidates by decoding the word graph using a word decoder and a word language model based on a vocabulary.

In a further embodiment, the subword unit tokens are particles and each particle is a sequence of one or more phonemes.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Figure 1:
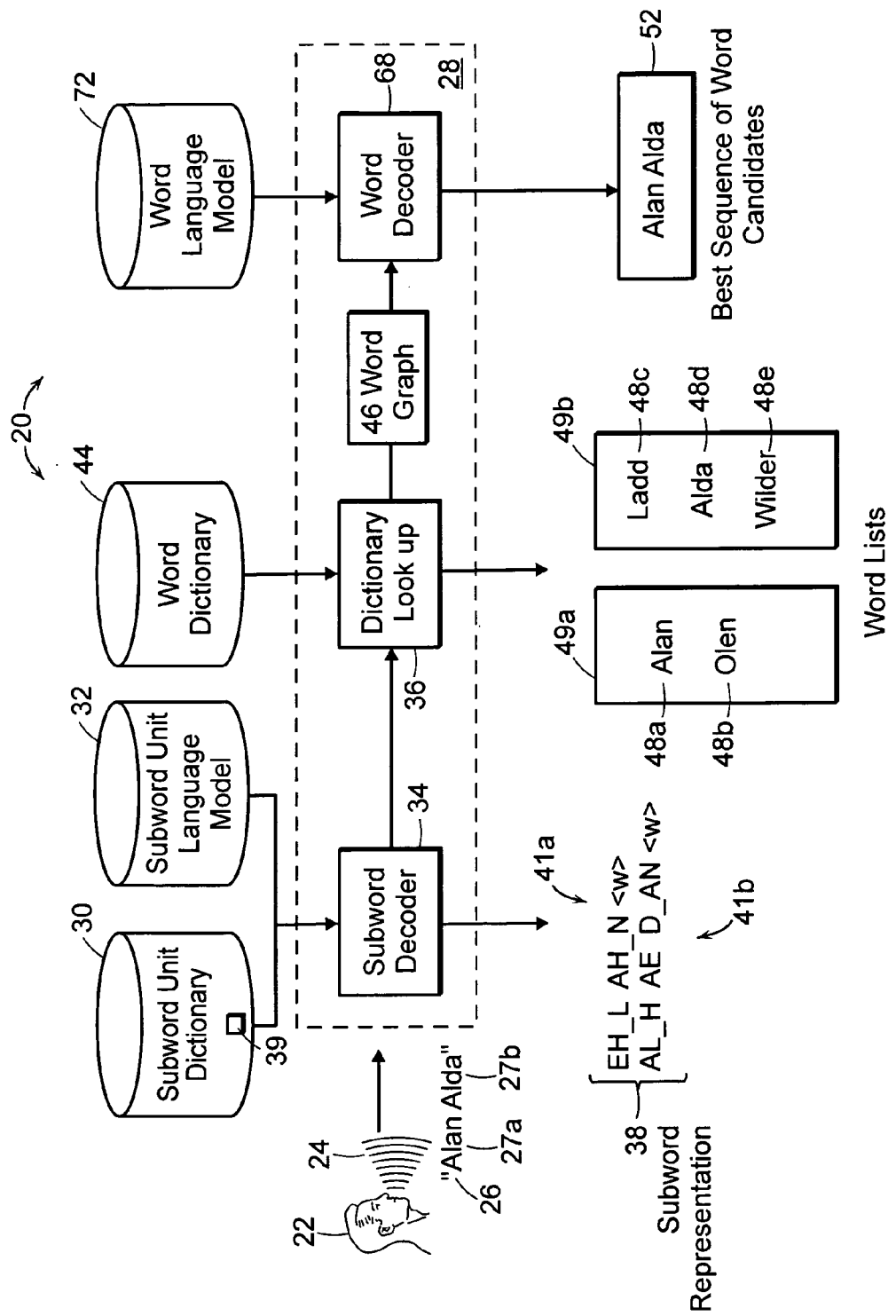
FIG. 1 is a block diagram of a speech recognition system including a subword decoder, dictionary lookup module, and word decoder according to a preferred embodiment of the invention.

FIG. 1 is a block diagram of a speech recognition or detection system 20, including a digital processor 28, a subword unit (particle) dictionary 30, subword unit (particle) language model 32, a subword decoder 34, dictionary lookup module 36, word dictionary 44, word graph 46, word decoder 68, and word language model 72, according to a preferred embodiment of the invention. A speaker 22 (user of the system 20) provides a spoken input 24 that is input to the speech recognition or detection system 20, typically, by speaking into a microphone attached to the system 20. Alternatively, the spoken input 24 is based on an audio recording of human speech. The spoken input 24 includes an input sequence 26 of input words 27 (e.g., 27a and 27b) provided by the user 22.

The speech detection system 20 is a computer system or part of a larger computer system and includes a digital processor 28 (e.g., microprocessor). The digital processor 28 hosts and executes a subword (particle) decoder 34, a dictionary lookup module 36 (subword to word graph expander), and a word decoder 68 stored in a working memory (e.g., RAM or random access memory, or data storage, such as a hard disk). As used herein, when the subword decoder 34, dictionary lookup module 36, or word decoder 68 performs some function, the digital processor 28 is performing that function under the direction of the instructions of the subword decoder 34, dictionary lookup module 36, or word decoder 68 stored in the memory. In other embodiments of the present invention, any or all of the components of the system 20, such as the subword decoder 34, dictionary lookup module 36, and/or word decoder 68, are implemented as hardware components (e.g., or one more ASIC's or application specific integrated circuits, or one or more PGA's or programmable gate arrays and the like).

The subword unit dictionary 30 is a dictionary of subword units (particles) 39. Subword units 39 are defined to be sequences of phonemes within words that are obtained from the phonetic representations of the words. For example, the word "hello" is represented as two subword units 39 (bigrams) "HH_AH" and "L_OW" (see e.g., FIG. 3), each bigram consisting of two phonemes 54. That is, the subword unit 39 or bigram "HH_AH" consists of the two phonemes 54 "hh" and "ah", and the subword unit 39 or bigram "L_OW" consists of two phonemes 54 "l" and "ow". For example, in a preferred embodiment of the present invention, the subword unit dictionary 30 is composed of a dictionary of about 7,000 particles. In a preferred embodiment, the subword unit dictionary 30 is constructed by examining a corpora of text (e.g., a body of a thousand newspaper articles) to determine the number of unique subword units 39 in the corpora. In a preferred embodiment, the subword unit dictionary 30 contains unigrams (one phoneme 54), bigrams (two phonemes 54), and trigrams (three phonemes 54), which represents subwords or parts of words. In other embodiments, subwords units may be longer than three phonemes 54. Short words, of course, are represented by one unigram, bigram or trigram. The subword unit dictionary 30 includes only subword units 39 that are typically encountered in the corpora of text. For example, the subword unit dictionary 30 does not include the trigram "K_K_K" because this trigram is not a trigram that is typically used within words (in the English language).

The subword unit language model 32 is a language model for the subword units 39, which are composed of phonemes 54. When identified in the spoken input 24 by the subword decoder 34 using the subword unit language model 32, the subwords are termed "subword unit tokens" 40 (see FIGS. 2 and 5 for examples of subword unit tokens 40 and their respective phonemes 54). In a preferred embodiment, the subword unit language model 32 is a statistical language model based on sequences of subword unit tokens 40. The subword unit language model 32 includes the frequencies of subword unit tokens 40 in a sequence of subword unit tokens 40, that is, the frequency of a given subword unit token 40, given a certain sequence of subword unit tokens 40 since the previous end of word marker 42 (see FIG. 2). For example, the subword unit language model 32 may contain different models (subword unit tokens 40) for one subword unit 39. For instance, a given subword unit 39, e.g., "ing", has one model (with one frequency) as an end-of-word subword unit token 40. That is, given a sequence of two or three subword unit tokens 40 since the last end of word marker 42, the subword unit token 40 "ing" has a relatively high probability of being the last subword unit token 40 in a word. The given subword unit 39 has a different model as a middle of the word subword unit token 40. In general, the subword unit token 40 "ing" appears less often in the middle of a word (appears less frequently in the middle of words in the sample or training corpora of text) and thus has a lower probability for being in the middle of a word than being at the end of a word.

Figure 2:
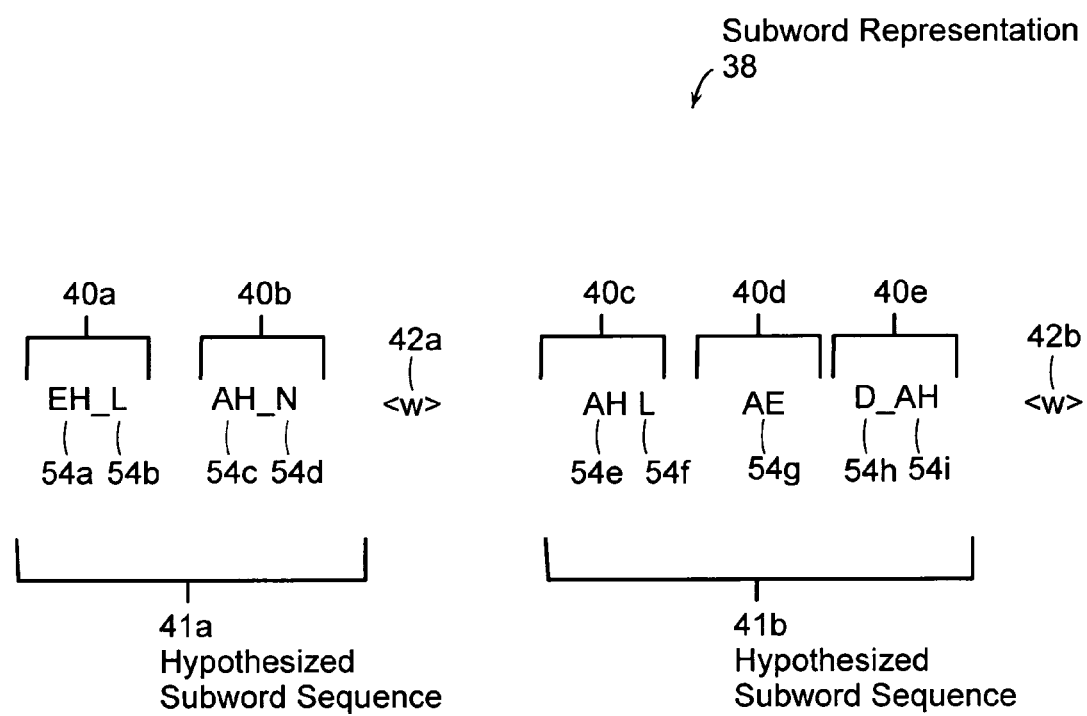
FIG. 2 is a diagram that illustrates a subword representation produced by the subword decoder based on the input sequence of words in the spoken input of FIG. 1.

The subword decoder 34 is a speech decoder that processes the spoken input 24 into a sequence 38 of subword unit tokens 40 (see FIG. 2). The subword decoder 34 uses speech decoding processes, such as Viterbi searching, n-best scoring, stack decoding at the subword level based on the subword unit dictionary 30 that includes a dictionary of subword units. In contrast, in a conventional approach, a speech decoder relies on a vocabulary or dictionary of words.

The subword decoder 34 produces a subword representation 38 (see FIG. 2) based on the input sequence 26, for example, in FIG. 1, of "Alan Alda" spoken by the speaker 22 as the spoken input 24. The subword representation 38 includes hypothesized subword sequences 41 (e.g., 41a, 41b) that represent hypotheses for words as determined by the subword decoder 34. The hypothesized subword sequences 41 (e.g., 41a, 41b) potentially match the input words 27 (e.g., 27a, 27b) of the input sequence 26. In the example shown in FIG. 2, the hypothesized subword sequence 41a includes subword unit token 40a "EH_L" composed of phonemes 54a "eh" and 54b "l" and subword unit token 40b "AH_N" composed of phonemes 54c "ah" and 54d "n". The hypothesized subword sequence 41b includes subword unit token 40c "AH_L" composed of phonemes 54e "ah" and 54f "l" and subword unit token 40d "AE" composed of the phoneme 54g "ae", and subword unit token 40e composed of phonemes 54h "d" and 54i "ah". The hypothesized subword sequences 41a and 41b are terminated by respective end of word markers 42a and 42b.

Referring again to FIG. 1, the dictionary lookup module 36 is a hardware or software module (as described above) that produces word lists 49 (e.g., 49a and 49b) of word candidates 48 (e.g. 48a, 48b, 48c, 48d, and 48e), based on the hypothesized subword sequences 41, that are candidates to match the input word 27 of the spoken input 24. The word dictionary 44 provides a dictionary of phonetic representations of words used by the dictionary lookup module 36 to determine word candidates 48. Each word list 49 is based on an expansion of one of the hypothesized subword sequences 41. For example, word list 49a is an expansion of the hypothesized subword sequence 41a, and word list 49b is an expansion of the hypothesized subword sequence 41b. The word graph 46 is a graph of word candidates 48 based on word lists 49 (see FIG. 3).

Figure 5:
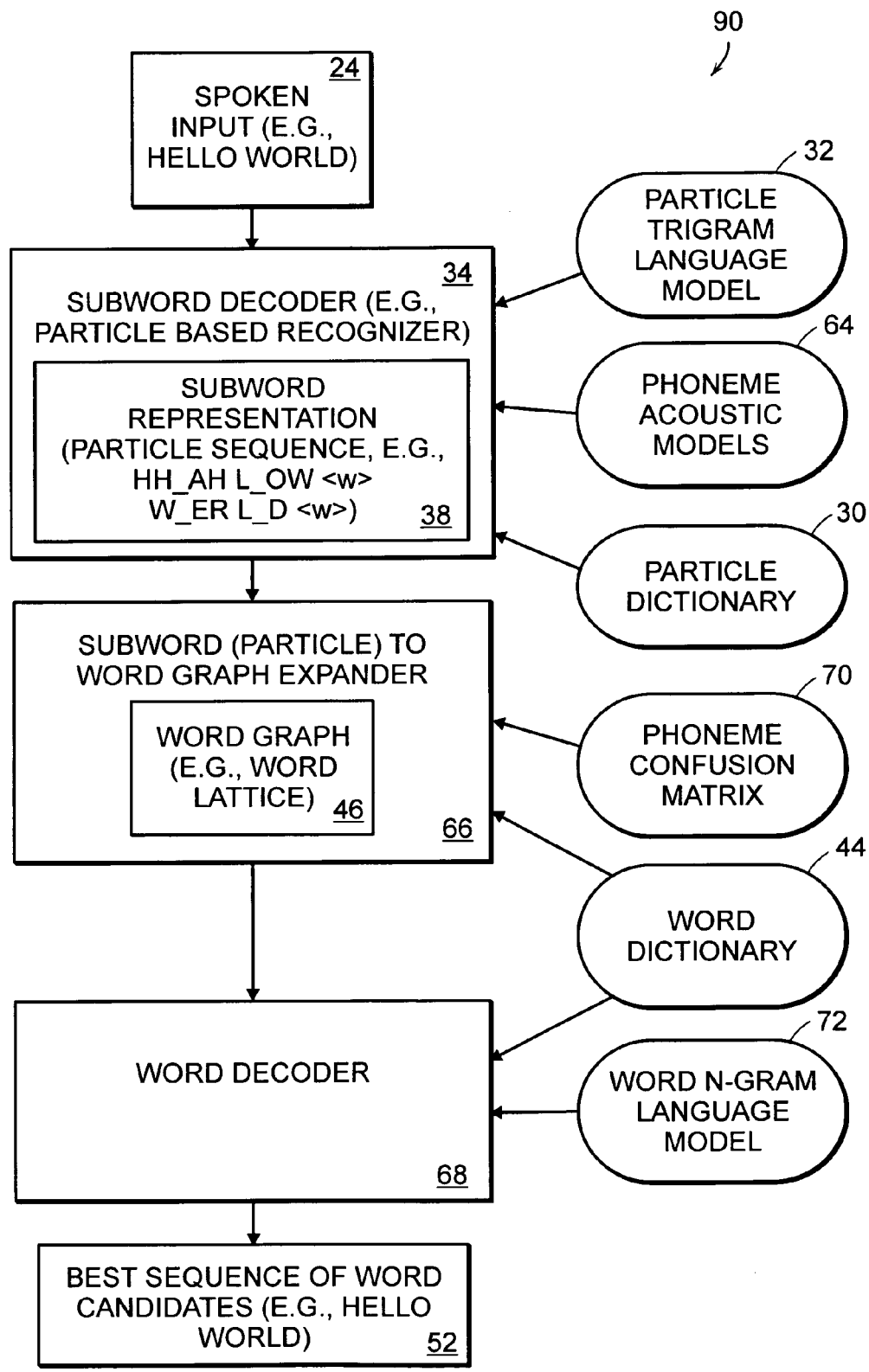
FIG. 5 is a block diagram of a speech detection system including a subword decoder, subword to word graph expander, and word decoder for FIG. 3.

The word decoder 68 is a hardware or software module (as described above) that uses the word language model 72 to produce from the word graph 46 a best sequence of word candidates 52 that is most likely to match the input sequence 26 of input words 27 (see also FIG. 5).

In one embodiment, a computer program product, including a computer readable or usable medium (e.g., one or more CDROM's, diskettes, tapes, etc.), provides software instructions for the subword decoder 34, the dictionary lookup module 36, and the word decoder 68. The computer program product may be installed by any suitable software installation procedure, as is well known in the art. In another embodiment, the software instructions may also be downloaded over an appropriate connection. A computer program propagated signal product embodied on a propagated signal on a propagation medium (e.g., a radio wave, an infrared wave, a laser wave, a sound wave, or an electrical wave propagated over the Internet or other network) provides software instructions for the subword decoder 34, the dictionary lookup module 36, and the word decoder 68. In alternate embodiments, the propagated signal is an analog carrier wave or digital signal carried on the propagated medium. For example, the propagated signal may be a digitized signal propagated over the Internet or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of the computer program product is a propagation medium that the computer may receive and read, such as by receiving the propagation medium and identifying a propagated signal embodied in the propagation medium, as described above for the computer program propagated signal product.

Figure 3:
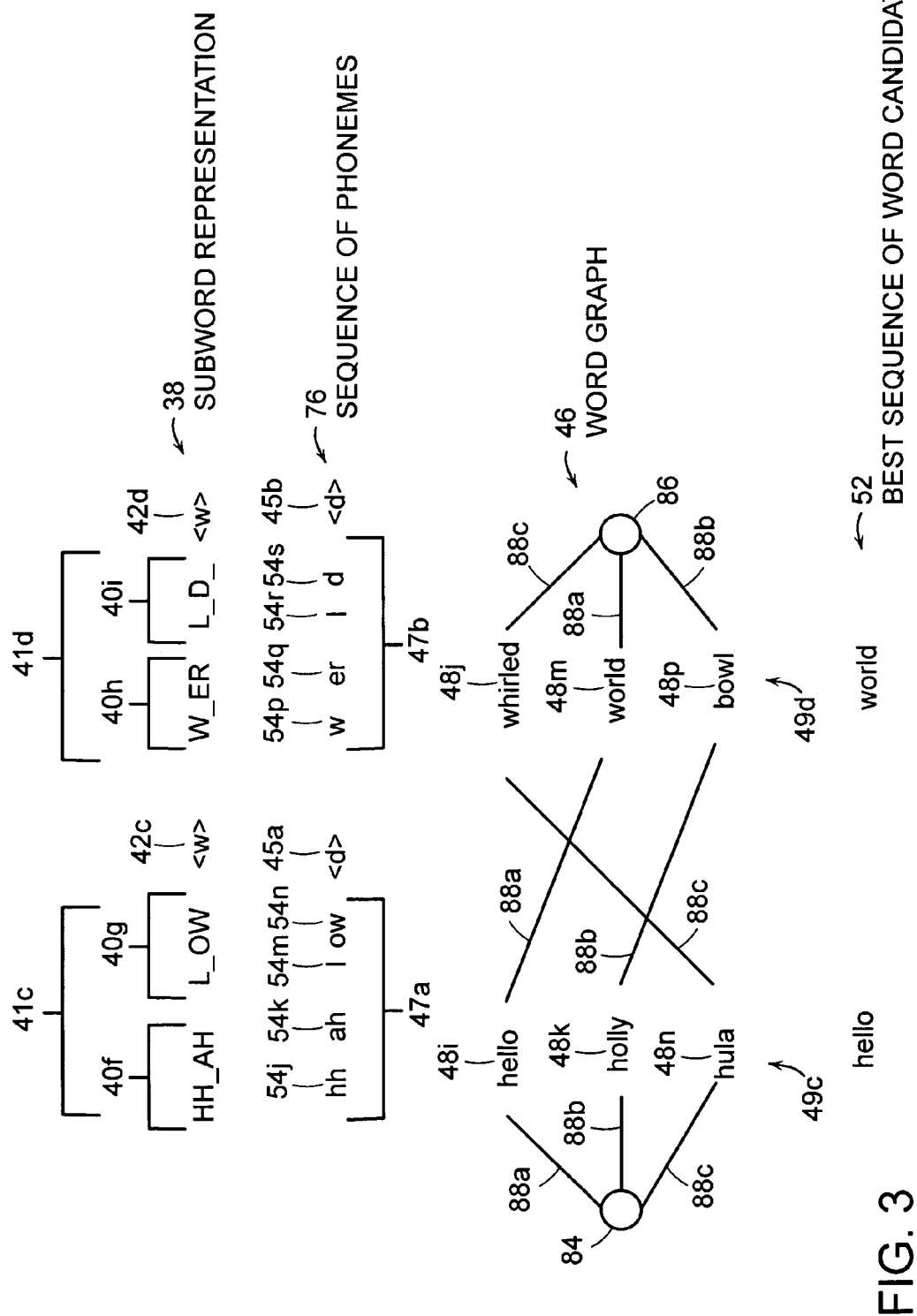
FIG. 3 is a diagram that illustrates a subword representation, a corresponding phoneme sequence, corresponding word graph, and preferred sequence of word candidates according to a preferred embodiment of the invention.

FIG. 3 illustrates the system 20 generated subword representation 38, corresponding phoneme sequence 76, corresponding word graph 46, and preferred sequence of word candidates 52 according to a preferred embodiment of the invention. The subword representation 38 includes hypothesized subword sequences 41c and 41d. Hypothesized subword sequence 41c includes subword unit tokens 40f and 40g, and end of word marker 42c indicates the termination of the hypothesized subword sequence 41c. Hypothesized subword sequence 41d includes subword unit tokens 40h and 40i, and end of word marker 42d indicates the termination of the hypothesized subword sequence 41d.

The phoneme sequence 76 is a sequence of phonemes 54 (e.g., 54j, 54k, 54m, 54n, 54p, 54q, 54r and 54s) that corresponds to the subword representation 38. End of word delimiters 45 (e.g., 45a and 45b) are derived from the end of word markers 42 (e.g., 42c and 42d). The end of word delimiters indicate the terminations of word phoneme strings 47a and 47b (based on the hypothesized words 41c and 41d) in the phoneme sequence 76.

The word graph 46 is a graph of an initial node 84, word lists 49c and 49d based on word candidates 48 (e.g., 48i, 48j, 48k, 48m, 48n, 48p), and terminal node 86. Each path 88 (e.g., 88a, 88b, 88c) in the word graph 46 indicates that path for a sequence of word candidates 48. Path 88a indicates the sequence "hello world". Path 88b indicates the sequence "holly bowl". Path 88c indicates the sequence "hula whirled".

Figure 4:
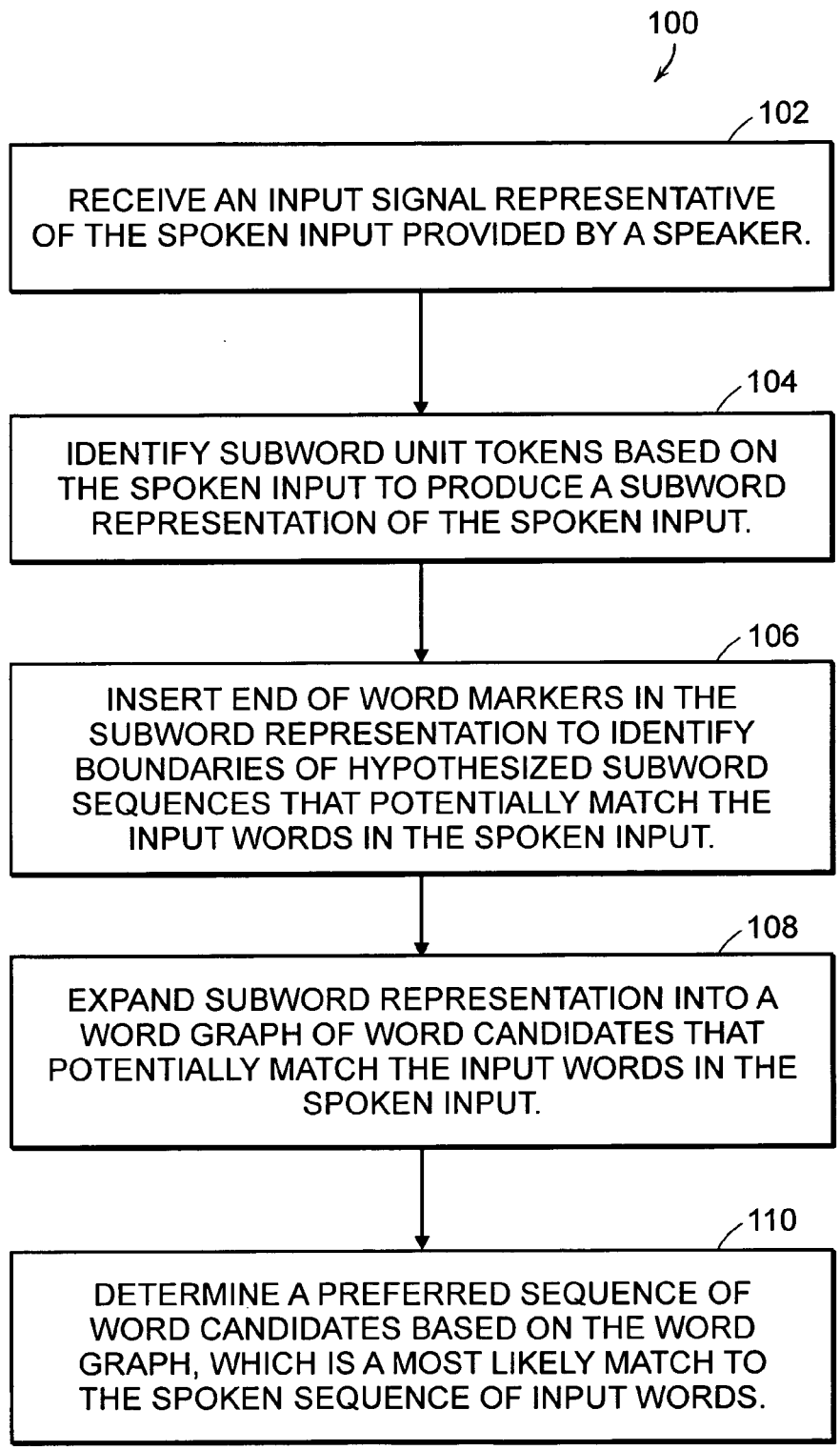
FIG. 4 is a flowchart of a procedure for detecting the input sequence of words in a spoken input for FIG. 3.

FIG. 4 is a flowchart of systems 20 procedure 100 for detecting the input sequence 26 of words 27 in a spoken input 24 for a preferred embodiment of the invention.

In step 102, the subword decoder 34 receives an input signal representative of the spoken input 24 (e.g., audio signal) provided by a speaker, or other means such as a tape recording of a speaker's voice. For example, the speaker 22 speaks into a microphone associated with the computer system 20, which converts the spoken input 24 (e.g. audio signal) into an electrical signal or representation based on the spoken input 24, which is communicated to the subword decoder 34 (e.g., by a cable or a computer bus).

In step 104, in one embodiment, the subword decoder 34 identifies subwords unit tokens 40 based on the spoken input 24 to produce a subword representation 38 of the spoken input 24. For example, the subword decoder 34 identifies subword unit tokens 40 based on the input representation (e.g., electrical signal) representing the spoken input 24.

In step 106, in one embodiment, the subword decoder 34 inserts end of word markers 42 in the subword representation 38 to identify boundaries of hypothesized subword sequences 41 that potentially match the input words 27 in the spoken input 26. The subword decoder 34 inserts each end of word marker 42 immediately after each subword unit (particle) token 40 that terminates a hypothesized subword sequence 41. Each end of word marker 42 indicates the termination of a hypothesized subword sequence 41.

In a preferred embodiment, the subword decoder 34 performs steps 104 and 106 as one combined step. As each subword unit token 40 is identified, the subword decoder 34 also identifies any subword unit token 40 that is likely to be at the end of a hypothesized subword sequence 41 when appropriate to do so based on the subword unit language model 32 (that is, concurrently attaches an end of word marker 42 to that subword unit token 40 to produce a modified subword unit token 40 including the end of word marker 42). For subword unit tokens 40 that are not identified as likely to be at the end of a hypothesized subword sequence 41, then the subword decoder 34 determines at the time of identifying each such subword unit token 40 that the subword decoder 34 does not need to attach an end of word marker 42 to that subword unit token 40.

The following is an example of portions of sentences from a spoken input 24 and the corresponding subword representations 38 produced by the subword decoder 34:

(1) sentence portion: IN WASHINGTON TODAY A CONGRESSIONAL COMMITEE
particles: IH_N_<w> W_AA_ SH_IH_NG_ T_AH_N_<w> T_AH_D_
EY_<w> AH_<w> K_AH_ N_G_ R_ EH_ SH_AH_ N_AH_L_<w> K_AH_M_ IH_T_IY_<w>

(2) sentence portion: HAS BEEN STUDYING BAD OR WORSE BEHAVIOR IN THE AIR
particles: IH_Z<w> B_AH_N_<w> S_T_ AH_D_IY_ IH_NG_<w> B_AE_D_<w> AO_R_<w> W_ER _S_<w> B_IH_ HH_EY_V_
Y_ER_<w> IH_N_<w> DH_AH_<w> Y_IH_R_<w>

(3) sentence portion: BY WHICH WE MEAN THE INCREASINGLY EVIDENT PROBLEM OF AIRLINE PASSENGERS
particles: B_AY_<w> HH_ W_IH_CH_<w> W_IY_<w> M_IY_N_<w> DH_
AH_<w> IH_N_ K_R_ IY_S_ IH_NG_<w> L_IY_ K_T_<w>
EH_V_ AH_D_AH_ N_T_<w> P_ R_AA_ B_L_ AH_M_<w>
AH_V_<w> DH_ AH_<w> EH_R_ L_AY_N_<w> P_ AE_S_AH_
N_JH_ ER_Z_<w>

(4) sentence portion: WHO GET SO OUT OF HAND ON A FLIGHT THAT THEY UNSETTLE AND SOMETIMES ENDANGER
particles: HH_UW_<w> G_EH_T_<w> S_OW_<w> AW _T_<w>
AH_V_<w> HH_ AE_N_D_<w> AA_N_<w> AH_<w> F_L_AY_
T_<w> DH_AE_T_<w> DH_E Y_<w> K_AH_M_ Z_<w> AE_
P_AH_L_<w> AE_N_D_<w> S_AH_M_ T_AY_ M_Z_<w> IH_N_<w>
D_E Y_N_ JH_ER_<w>

(5) sentence portion: OTHER PASSENGERS AND THE CREW
particles: AH_V_<w> AH_DH_ER_<w> P_ AE_S_AH_ N_JH_ ER_Z_<w>
AE_N_D_<w> DH_ AH_<w> K_R_UW_<w>

In most cases, in the above example, the subword unit (particle) tokens 40 and end of word markers 42 provide a close match to the input words 27. For example, the subword decoder 34 decodes the input word 27 "SOMETIMES" as shown above in sentence (4) as three subword unit tokens 40 for the hypothesized subword sequence 41 as "S_AH_M_ T_AY_ M_Z_<w>". Occasionally, due to pronunciation, poor acoustics, or other problems, the match is not as close. For example, the subword decoder 34 decodes the input word 27 "UNSETTLE" as shown above in sentence (4) as the hypothesized subword sequences 41 "K_AH_M_Z_<w> AE_ P_AH_L_<w>". Nevertheless, the present invention provides a high rate of close matches for a subword decoder 34 that does not require a word dictionary 44 in the first (particle detection) stage of the procedure (steps 102–106). Thus the present invention provides for the first stage of speech detection (steps 102–106) that is independent of a specific vocabulary or word dictionary 44, and the subword decoder 34 provides output (the subword representation 38) that can then be processed for different vocabularies and word dictionaries 44 in the later dictionary lookup module 36 or second speech detection stage (steps 108 and 110, to be discussed later). The later dictionary lookup module 36 stage can also be located on a different computer system (e.g., server) than the subword decoder 34 (e.g., palmtop computer, personal digital assistant, or other client or small computer).

In step 108, the dictionary lookup module 36 expands the subword representation 38 into a word graph 46 of word candidates 48 for the input words 27 in the spoken input 24. Each word candidate 48 is phonetically similar to one of the hypothesized subword sequences 41. The dictionary lookup module 36 generates a sequence 76 of phonemes by expanding the subword unit tokens 40 in the subword representation 38; that is, by identifying and separating out the individual phonemes 54 in each subword unit token 40. The sequence 76 of phonemes includes the end of word delimiters 45. Each end of word delimiter 45 is based on the respective end of word marker 42 in the respective subword representation 38. For example, end of word delimiter 45a (see FIG. 3) is derived from end of word marker 42c, and end of word delimiter 45b is derived from end of word marker 42d. Each end of word delimiter 45 indicates (identifies) a word phoneme string 47 (e.g., 47a and 47b) within the sequence of phonemes 76. The word phoneme string 47 corresponds to a hypothesized subword sequence 41 as indicated by the subword unit tokens 40 in the hypothesized subword sequence 41 and the end of word marker 42 that indicates the end of the hypothesized subword sequence 41. The dictionary lookup module 36 expands each word phoneme string 47 into a list of phonetically similar word candidates 48 to form the word graph 46.

In step 110, the word decoder 68 determines a preferred sequence 52 of word candidates 48. The preferred sequence 52 of word candidates 48 represents a most likely match to the input sequence 26 of input words 27.

FIG. 5 is a block diagram of a speech recognition (detection) system 90 for a preferred embodiment of the invention. The speech recognition system 90 is one example of the speech recognition system 20 of FIG. 1. The speech recognition system 90 of FIG. 5 includes a subword decoder (e.g., particle based recognizer) 34, a subword (particle) to word graph expander 66 (e.g., dictionary lookup module 36), and a word decoder 68. The subword decoder or particle based recognizer 34 is based on a particle trigram language model 32, phoneme acoustic models 64, and a particle dictionary 30. The subword (particle) to word graph expander 66 uses a phoneme confusion matrix 70 and word dictionary 44 to produce the word graph 46 of word candidates 48. The word decoder 68 uses the word dictionary 44 and a word N-gram language model 72 to produce the best sequence 52 of word candidates 48.

The subword decoder or speech recognizer 34 is built using concatenated triphoneme acoustic models to represent the particle (subword units) 40 and a particle language model 32 to represent the linguistic dependencies between particles 40. By recognizing particles from speech in the first stage of speech detection by the subword decoder 34, the decision on a set of words to recognize (as the most likely sequence of words 52 to match the input sequence 26) can be postponed. The recovery of words (word candidates) 48 from the hypothesized subword sequence 41 is performed as a later processing stage (the second speech detection stage after the particle based recognizer 34 produces the particle sequences 38) after the word vocabulary has been defined and a corresponding dictionary 44 and language model 72 constructed.

Before processing any spoken input 24, in order to construct the particle dictionary 30, the particle-based speech recognizer uses a particle selection algorithm to determine a set of subword units 39 automatically in isolation from the acoustic data. The algorithm decomposes words into subword units 39 so as to maximize the leaving-one-out likelihood of a subword bigram language model on the training data. The subword units 39 that occur at the ends of words are attached to an identifier or end of word marker 42 that defines the boundary of a hypothesized subword sequence 41. The particle trigram language model 32 includes acoustic models that are constructed for each subword unit 39, in one embodiment, by concatenating triphoneme HMMs (Hidden Markov Models) that have been trained in a manner similar to that for training triphoneme HMMs for acoustic word models. In one embodiment, the particle language model 32 is a conventional back-off language model built using subword unit tokens 40 instead of words as the modeling units.

In one embodiment, the particle recognizer 34 is a large vocabulary recognizer that recognizes particles (subword units) 39. Suitable approaches used in decoding, such as Viterbi search, n-best scoring, and stack decoding, are all applicable and maybe used.

During the recognition process as shown in FIG. 5, the particle to word graph expander 66 first expands the top scoring subword hypothesis of hypothesized subword sequences 41 from the subword-based recognizer 34 into the word graph 46 of phonetically similar word candidates 48 (see FIG. 3) using a phoneme confusion matrix 70.

Each word in the graph 46 has an associated pseudo acoustic score. The word decoder 68 then re-decodes the word graph 46 using a search algorithm with a word language model 72 to produce the final word hypothesis (e.g., best sequence 52 of word candidates 48).

In the expansion process, the subword (particle) to word graph expander 66 decomposes the subword unit tokens 40 output by the particle speech recognizer 34 into a sequence 76 of corresponding phonemes (see FIG. 3). As word boundaries are known and labeled, the particle to word graph expander 66 describes each hypothesized subword sequence 41 as a word phoneme string 47. The subword to word graph expander 66 compares each word phoneme string 47 to every word of the vocabulary in the word dictionary 44 using a pronunciation distance metric.

The subword (particle) to word graph expander 66 computes this pronunciation distance using a string alignment algorithm. The subword to word graph expander 66 obtains the insertion, deletion, and substitution costs from a pre-computed phoneme confusion matrix 70. In addition to the matching cost, the subword to word graph expander 66 applies a length penalty, which is computed by evaluating the phoneme string length difference between the decoded word phoneme string 47 and the pronunciation (phoneme string for a word) from the word dictionary 44. The particle to word graph expander 66 uses the word pronunciation distance to sort the whole vocabulary in the word dictionary 44, the most likely word being placed at the top of the list.

Examples of a pronunciation distance metric and a confusion matrix, both suitable for use with the present invention, are described in "Systems and Methods for Combining Subword Detection and Word Detection for Processing a Spoken Input," filed Dec. 12, 2001, application Ser. No. 10/017,797, the entire teachings of which are incorporated herein by reference.

The phoneme confusion matrix 70 used to compute the word distance metric was trained using the TIMIT corpus, a collection of 6,300 short, hand-labeled utterances. The training procedures consists of running phoneme recognition on all utterances in the corpus, and then aligning the hypothesized results with hand labeled transcriptions. The alignment routine uses the same cost for deletion, insertion, and substitution, regardless of the phonemes 54 involved. Alternative approaches are possible for training the confusion matrix 70, including the use of phoneme classification, EM, or genetic algorithms.

The expanded word list for each word phoneme string 47 forms a lattice of words (the word graph) 46 along time. Each word frame (e.g., indicated by the vertical lists 49c and 49d of words as shown in FIG. 3) contains the N-best word candidates 48 sorted by the word pronunciation distance as described previously. By construction, all word candidates 48 within the same frame have the same time boundaries.

The word decoder 68 computes the most likely sequence of words (e.g., 52) through the lattice (e.g., as indicated by path 88a in FIG. 3).

The word decoder 68 computes the best score at every step of the search through lattice/graph 46 by combining the pronunciation score as previously described, and an N-gram word probability. For every word candidate 48 of the lattice (word graph) 46, the word decoder 68 recomputes a look-ahead score and provides an upper bound value of the expected score at the end of the word sequence from that word cell. The word decoder 68 uses the sum of the best score and look-ahead scores as a key for inserting an active word lattice cell into a sorted list of active cells, or stack. At every step of the search, the word decoder 68 pops the word cell with the highest score off the stack, and scores it against all the possible next words of the next frame. To make the search more tractable, only the top 100 active paths 88 within each frame are kept. When the last frame is scored, the word decoder 68 returns the most likely sequence of words 52, or best path 88 (e.g., 88a) through the lattice 46.

The depth of the lattice 46 depends on how many words 48 are expanded per word phoneme string 47. Since the word decoder 68, in one embodiment, uses a very large vocabulary of over 250,000 words, the present invention generates at least 10 word candidates 48 for each word phoneme sequence (string) 47 to account for words that are misspelled in the dictionary 44 that have the same pronunciation. For example, if the vocabulary in the word dictionary 44 is determined by sampling a large number of newspaper articles, or a large number of web pages from the Internet, some words are likely to be misspelled and thus have a correctly spelled version of the word and one or more misspelled versions of the same word.

While this invention has been particularly shown and described with references to preferred embodiments thereof, it will be understood by those skilled in the art that various changes in form and details may be made therein without departing from the scope of the invention as defined by the appended claims.

For example, in one embodiment, the subword decoder 34 is implemented on a client computer and the dictionary lookup module 36 (subword to word graph expander 68) and/or word decoder 68 is implemented on a server computer system. The client computer can be a palmtop, laptop computer, personal digital assistance, individual desktop PC computer, or other local, small, or client computer or communications device having computing capabilities. The server computer can be a separate computer accessed by the client over a network (hard wired or wireless) or other remote communications approach. In general, any or all of the components of the present invention (e.g., 34, 36, 66, 68) can be implemented in a distributed computing approach. For example, the subword decoder 34, the subword to word graph expander 66, and the word decoder 68 can be implemented on separate processors 28, which are part of the same or separate computer systems.

What is claimed is:

1. A method for recognizing an input sequence of input words in a spoken input, comprising computer implemented steps of:

generating a subword representation of the spoken input as a concatenated phoneme sequence, the subword representation including (i) subword unit tokens based on the spoken input and (ii) end of word markers that identify boundaries of hypothesized subword sequences that potentially match the input words in the spoken input;

expanding the subword representation into a word graph of word candidates for the input words in the spoken input using a phoneme confusion matrix, each word candidate being phonetically similar to one of the hypothesized subword sequences, said expanding including enabling creation of words outside of a word vocabulary and generating a word transcription from phonemes of the spoken input; and determining a preferred sequence of word candidates based on the word graph, the word candidates sorted using a pronunciation distance metric, the preferred sequence of word candidates representing a most likely match to the spoken sequence of the input words.

2. The method of claim 1, wherein the step of generating the subword representation includes:

identifying the subword unit tokens based on the spoken input to produce the subword representation of the spoken input, and inserting end of word markers in the subword representation, each end of word marker indicating each terminating subword unit token that identifies an end of a hypothesized subword sequence.

3. The method of claim 2, wherein the step of identifying the subword unit tokens includes determining the subword unit tokens based on a subword unit dictionary and a subword unit language model.

4. The method of claim 3, wherein the subword unit language model is a statistical language model.

5. The method of claim 1, wherein the step of expanding the subword representation into the word graph includes:

generating a sequence of phonemes by expanding the subword unit tokens in the subword representation, the sequence of phonemes including end of word delimiters, each end of word delimiter based on the respective end of word marker in the respective subword representation and each end of word delimiter indicating a termination of a word phoneme string within the sequence of phonemes; and expanding each word phoneme string into a list of phonetically similar word candidates based on a word vocabulary to form the word graph.

6. The method of claim 1, wherein the step of determining the preferred sequence of word candidates includes decoding the word graph using a word decoder and a language model based on a word vocabulary.

7. The method of claim 1, wherein the subword unit tokens are particles, each particle including at least one phoneme.

8. A speech recognition system for recognizing an input sequence of input words in a spoken input, the system comprising:

a subword decoder for generating a subword representation of the spoken input as a concatenated phoneme sequence, the subword representation including (i) subword unit tokens based on the spoken input and (ii) end of word markers that identify boundaries of hypothesized subword sequences that potentially match the input words in the spoken input; and a dictionary lookup module for expanding the subword representation into a word graph of word candidates for the input words in the spoken input using a phoneme confusion matrix, each word candidate being phonetically similar to one of the hypothesized subword sequences, the dictionary lookup determining a preferred sequence of word candidates based on the word graph, the word candidates sorted using a pronunciation distance metric, the preferred sequence of word candidates representing a most likely match to the spoken sequence of the input words, the dictionary lookup module (i) enabling creation of words outside of a word vocabulary and (ii) generating a word transcription from phonemes of the spoken input.

9. The speech detection system of claim 8, wherein the subword decoder:
identifies the subword unit tokens based on the spoken input to produce the subword representation of the spoken input, and
inserts end of word markers in the subword representation, each end of word marker indicating each terminating subword unit token that identifies an end of each hypothesized subword sequence.

10. The speech detection system of claim 9, wherein the subword decoder determines the subword unit tokens based on a subword unit dictionary and a subword unit language model.

11. The speech detection system of claim 10, wherein the subword unit language model is a statistical language model.

12. The speech detection system of claim 8, wherein the dictionary lookup module expands the subword representation into the word graph by:
generating a sequence of phonemes by expanding the subword unit tokens in the subword representation, the sequence of phonemes including end of word delimiters, each end of word delimiter based on the respective end of word marker in the respective subword representation and each end of word delimiter indicating a termination of a word phoneme string within the sequence of phonemes; and
expanding each word phoneme string into a list of phonetically similar word candidates based on a word vocabulary to form the word graph.

13. The speech detection system of claim 8, wherein the dictionary lookup module determines the preferred sequence of word candidates by decoding the word graph using a word decoder and a word language model based on a word vocabulary.

14. The speech detection system of claim 8, wherein the subword unit tokens are particles, each particle including at least one phoneme.

15. A computer program product embodied on a CDROM comprising:
a computer usable medium for recognizing an input sequence of input words in a spoken input; and
a set of computer program instructions embodied on the computer usable medium, including instructions to:
generate a subword representation of the spoken input as a concatenated phoneme sequence, the subword representation including (i) subword unit tokens based on the spoken input and (ii) end of word markers that identify boundaries of hypothesized subword sequences that potentially match the input words in the spoken input;
expand the subword representation into a word graph of word candidates for the input words in the spoken input using a phoneme confusion matrix, each word candidate being phonetically similar to one of the hypothesized subword sequences, wherein the instructions to expand include instructions (i) enabling creation of words outside of a word vocabulary and (ii) generating a word transcription from phonemes of the spoken input; and
determine a preferred sequence of word candidates based on the word graph, the word candidates sorted using a pronunciation distance metric, the preferred sequence of word candidates representing a most likely match to the spoken sequence of the input words.

* * * * *

UNITED STATES PATENT AND TRADEMARK OFFICE
CERTIFICATE OF CORRECTION

PATENT NO. : 7,181,398 B2  
APPLICATION NO. : 10/109251  
DATED : February 20, 2007  
INVENTOR(S) : Jean-Manuel Van Thong et al.

Page 1 of 1

It is certified that error appears in the above-identified patent and that said Letters Patent is hereby corrected as shown below:

In column 4, line 54, delete "54 "1" and" and insert -- 54 "l" and --, therefor.

In column 5, line 55, delete "54b "1" and" and insert -- 54b "l" and --, therefor.

In column 5, line 59, delete "54f "1" and" and insert -- 54f "l" and --, therefor.

Signed and Sealed this
Fourth Day of December, 2012

David J. Kappos
*Director of the United States Patent and Trademark Office*